Figure 1:
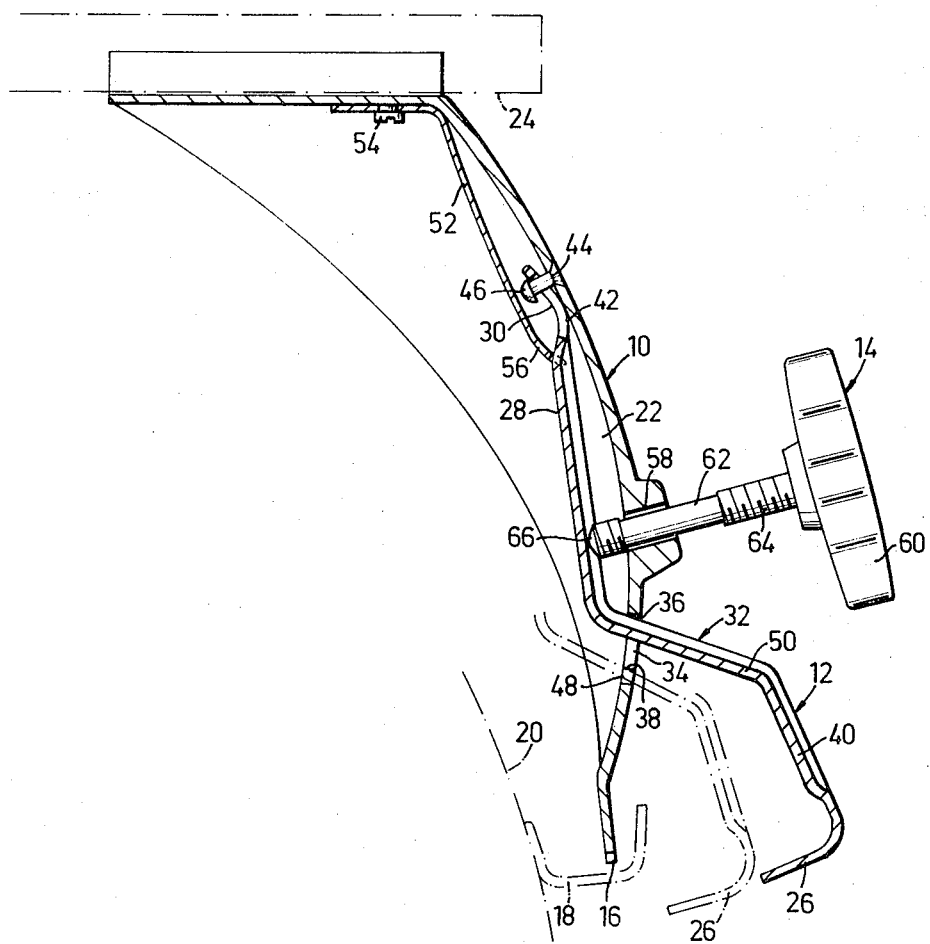

United States Patent [19]

Joos

[11] 3,837,547
[45] Sept. 24, 1974

[54] SUPPORT LEG TO BE FASTENED IN ROOF GUTTERS OF AUTOMOBILES

[75] Inventor: Eric Joos, Malung, Sweden

[73] Assignee: AB Eric Joos, Malung, Sweden

[22] Filed: Oct. 31, 1972

[21] Appl. No.: 302,412

[30] Foreign Application Priority Data
Nov. 1, 1971  Sweden.............................. 13882/71

[52] U.S. Cl....................... 224/42.1 E, 224/42.1 F
[51] Int. Cl................................................ B60n 9/08
[58] Field of Search...... 224/42.1 F, 42.1 E, 42.1 G, 224/42.1 R; 248/226 R

[56] References Cited
UNITED STATES PATENTS
2,940,652  6/1960  Willard........................... 224/42.1 G
3,385,488  5/1968  Bronson.......................... 224/42.1 F FOREIGN PATENTS OR APPLICATIONS
648,303  5/1964  Belgium........................... 224/42.1 F
395,764  12/1965  Switzerland..................... 224/42.1 F
1,515,857  1/1968  France............................. 224/42.1 F
1,415,342  9/1965  France............................. 224/42.1 F
970,593  9/1964  Great Britain.................. 224/42.1 F
100,778  8/1962  Norway........................... 224/42.1 F Primary Examiner—Robert J. Spar
Assistant Examiner—Jerold M. Forsberg
Attorney, Agent, or Firm—Cushman, Darby & Cushman

[57] ABSTRACT

A support leg to be fastened in roof gutters of automobiles comprising a leg and a separate hook-shaped clamping plate to be moved with its hook end towards the lower end of the clamping plate by means of an adjusting screw. The clamping plate extends through an opening in the clamping plate and is guided to be displaced upwardly when the screw is tightened.

8 Claims, 3 Drawing Figures

SUPPORT LEG TO BE FASTENED IN ROOF GUTTERS OF AUTOMOBILES

For carrying a load above an automobile roof one uses transversely extending bars which are provided with support legs on the ends, these support legs being fastenable to the roof gutter of the automobile roof. The support legs can also be disposed on the sides in different positions to form a so-called roof rack for carrying a load.

An essential requirement for support legs of this type is that they must be securely fastened to the roof gutters so that they will be able to withstand those forces which occur during powerful accelerations and brakings as well as when the automobile turns. Furthermore they should be able to be fastened on the roof gutter in a speedy and secure manner. They should also be so constructed to enable anyone, without difficulty, to attach them to the roof gutter in a secure manner without the help of special tools.

This is achieved with a support leg which has the characteristics disclosed in claim 1. Because of the fact that the clamping plate is guided in the manner disclosed according to the invention, the major portion of the forces on the leg, when these forces work to lift the leg up from the gutter, will be transferred directly to the clamping plate, which is held in the locked position by an adjusting means, which only absorbs an insignificant portion of the forces occurring. In order to release the leg from the roof gutter the adjusting means need only be subjected to insignificant forces to swing the clamping plate into a position beside the roof gutter.

These and other details and advantages of the invention will be described in more detail with reference to the enclosed drawings which show an appropriate embodiment of the support leg according to the invention.

Figure 2:
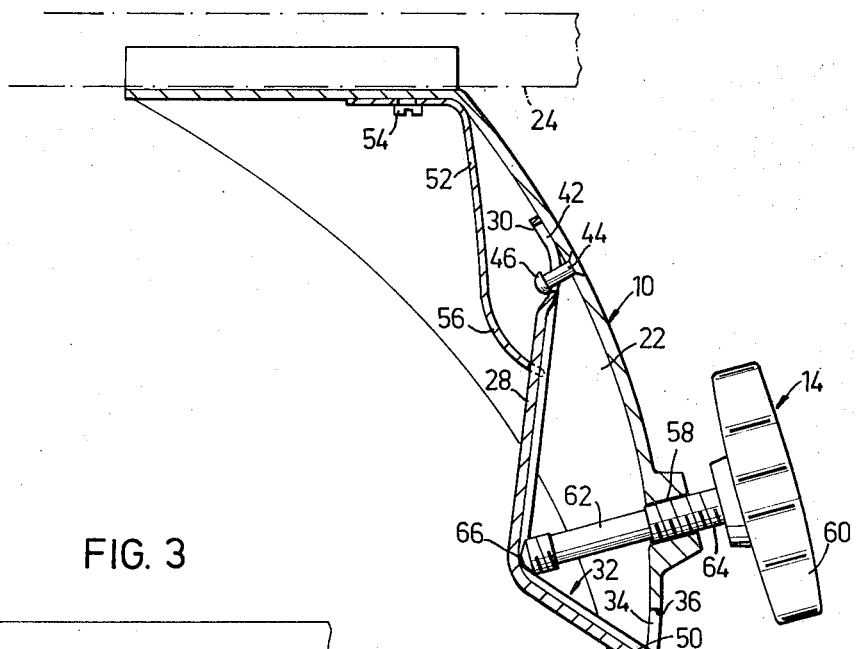
Figure 3:
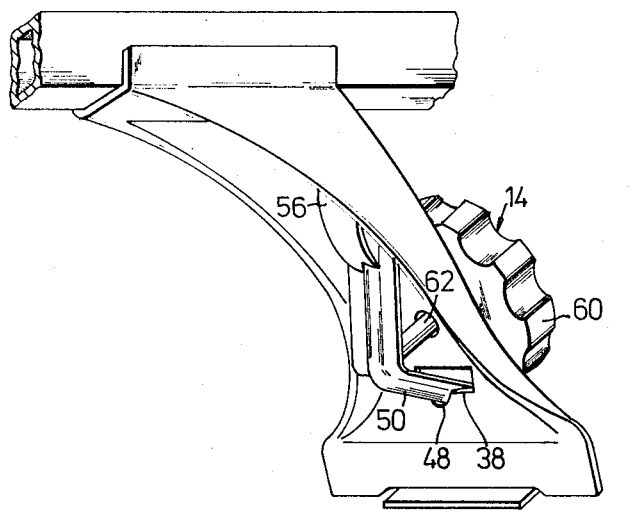

FIG. 1 is a longitudinal section of the support leg with the clamping plate according to the invention which is in its free position. FIG. 2 shows the same longitudinal section as FIG. 1 but with the clamping plate in its locked position. FIG. 3 is a schematic perspective view of the support leg as it looks from the inside.

The support leg consists mainly of a leg plate 10, a clamping plate 12 and a tightening screw 14.

The leg plate 10 has a lower edge part 16 which is designed to be placed in the roof gutter 18 of an automobile roof 20. The lower edge part 16 becomes a leg 22 which has a U-section. At the top end of the leg there is a bar 24 or the like attachable by screws. The bar in the example shown consists of a pipe with a rectangular cross section. At the opposite end of the bar (not shown) there is an additional support leg of the type shown in FIG. 1 so that, when both legs are clamped in the roof gutters on each side of the automobile roof, the bar will lie laterally across the roof for carrying a load. Alternatively, the bar can be a part of a roof rack.

The lower part of the clamping plate 12 is constructed at its lower edge with the hook 26 facing inwards.

The upper part of the clamping plate 12 consists of an arm 28 which extends in the direction between the upper and lower ends of the leg 10. The upper end part 30 of the arm is rockably mounted on the inside of the leg and is displaceable between an upper position, FIG. 2, and a lower position, FIG. 1. The arm can be swung from an inner position close to the inside of the leg 10, FIG. 1, to an outer position, FIG. 2. The lower end of the arm is extended with a guiding means 32 which is directed towards the leg and extends out through a slot-shaped opening 34 in the leg. The position of the upper and lower edges 36,38 of the opening are such that when the arm 28 is close to its swung-out outer position, the guiding means 32 will be against the lower edge 38 of the opening, while the guiding means 32 lies in the vicinity of the upper edge 36 of the opening when the arm is close to its inner position.

The outer end of the guiding means extends to the lower part 40 of the clamping plate which is constructed with the hook 26.

The upper end part 30 of the arm is bent somewhat to form a suitable supporting surface when the arm rocks between its inner and outer positions. The arm is provided in this part with a longitudinal slot opening 42 in which a tap 44 is inserted which is fastened to the leg 10. The arm can thus be displaced vertically between an upper and a lower position in relation to the tap, the distance to the head of which being at the same time long enough so that the arm can rock freely in relation to the tap.

The upper edge 36 of opening 34 is straight. There is a notch 48 in the middle of the lower edge which serves as a guide for a longitudinal ridge 50 on the underside of the guiding means of the clamping plate.

The clamping plate 12 is held in its inner position by means of a plate spring 52 which is fastened at its upper end with a screw 54 on the inside of the upper end of the leg. The lower end 56 of the plate spring presses against the arm 28 in a position below the tap 44 so that the arm assumes its inner position in FIG. 1. From this position the clamping plate 12 can be swung with the help of a tightening screw 14 which is mounted in a threaded hole 58 in the leg 10. The screw is provided with a knob 60 so that it can be turned without the help of a tool. The screw has an unthreaded part 62 which can be moved freely in the threaded hole 58 and this means that the screw can be displaced freely in the hole for a distance corresponding to the length of the unthreaded part. In FIG. 1 the screw is loose in the threaded hole 58 and can be pressed in until the inner threaded part 64 of the screw engages with the threaded hole.

After the leg 10 is set into the roof gutter 18 (FIG. 1), tightening is carried out in the following manner. The hook 26 of the clamping plate lies freely beside the roof gutter having enabled the leg to be easily set into the gutter. The tightening screw 14 is now pressed in until its inner threaded part 64 engages the thread of the hole 58. As the screw is pressed, the end 66 of the screw will press against the inside of the arm 28 and swing it against the pressure of the plate spring 52 into the intermediate position indicated in FIG. 1 by dot-and-dash lines. During this swinging of the arm 12, the guiding means 32 of the clamping plate will swing freely in the opening 34 from a position in the vicinity of the upper edge 36 of the opening to a position near the lower edge 38 of the opening or in contact with the same. During this swinging into contact with the lower edge of the opening, the arm 12 will remain in its lower position in relation to the tap 44. The hook 26 is moved inward and somewhat downward to the dash-and-dot position in FIG. 1.

When the arm 28 is further swung out by screwing in the screw 14, the guiding means 32 will be displaced towards the lower edge 38 of the opening. The angle of the guiding means in relation to the arm is such that the arm 28 will be displaced upward as the guiding means is moved inward. In the example shown the angle is obtuse between the arm 28 and the guiding means 32, but it can also be less obtuse and be about 90° if one desires a less powerful upward displacement of the arm.

When the screw 14 is screwed in, the end 66 of the screw will move its point of contact with the arm 28 from a position above the transition point between the arm 28 and the guiding member 32 to a position where the end of the screw lies in the corner between the arm and the guiding member as shown in FIG. 2.

Because the arm 28 is forced to be displaced upward in this last part of the swinging up of the arm 28 to the position in FIG. 2, the hook 26 of the clamping plate will also be moved upward from the dash-and-dot position in FIG. 1 to the locked position shown in FIG. 2 in which the hook 26 lies against the underside of the gutter 18 and holds the edge 16 of the leg in the gutter at the same time as the underside of the guiding means lies against the lower edge 38 of the opening. When forces work on the leg to lift the leg, these forces will be transferred from the lower edge 38 of the opening to the underside of the guiding means 32 and thus directly to the hook 26 which grips the roof gutter. Only insignificant forces are transferred to the screw 14. These forces can be further reduced by making the angle between the guiding means 32 and the lower part 40 of the clamping plate somewhat smaller than that shown.

In order to release the leg, one only needs to screw out the screw 14 until it releases its grip on the thread in the hole 58, i.e. to the intermediate position in FIG. 1. Thereafter the spring 52 takes over the continued swinging out and moves the clamping plate 12 to the position in FIG. 1.

What is claimed is:

1. A support device adapted to be attached in a roof gutter of an automobile comprising: a leg plate having an upper end for supporting a load and having a lower end which is insertable in the gutter to engage the bottom surface thereof; a clamping plate movable between an unlocking position and a locking position, said clamping plate having a lower hook-shaped portion disposed on the outside of said leg plate and engageable with the lower surface of the gutter so as to clamp said lower end of said leg plate in the gutter when said clamping plate is in its locking position, said clamping plate having an arm which extends upwardly from said hook-shaped portion and which passes through an opening in said leg plate so that the upper portion of said arm is disposed on the inside of said leg plate; mounting means at the upper end of said arm mounting said clamping plate for limited displacement between an upper position and a lower position with respect to said leg plate and for swinging movement with respect to said leg plate in a direction such that the portion of the arm disposed on the inside of said leg plate swings between an inner position near said leg plate and an outer position more remote from said leg plate while simultaneously said hook-shaped portion swings between an unlocking position spaced from said leg plate and a locking position closer to said leg plate; and adjusting means for applying a swinging force to said arm at a location below said mounting means in a direction to swing said arm toward its locking position; and a spring biasing said arm towards its unlocking position; and guide means for cooperating with said arm during swinging movement of the latter toward its locking position to guide said arm upwardly so that said hook-shaped portion engages the lower surface of the gutter.

2. A support device as in claim 1 wherein said mounting means for said arm includes a slot in the upper end of said arm extending longitudinally of said arm and a guide tap lying in said slot, said guide tap having one end attached to said leg plate and having a head on its other end holding said arm on said tap and permitting rocking of the arm relative to said leg plate.

3. A support device as in claim 1 wherein said spring is a plate spring having an end attached to said leg plate and having a free end bearing against said arm at a point below said mounting means for said arm.

4. A support device as in claim 1 wherein said guide means for cooperating with said arm during swinging movement thereof is the lower edge of said opening in said leg plate, said opening being of such size and location that said arm moves freely in said opening during initial swinging movement of said arm and during continued swinging movement engages said lower edge of said opening and is displaced toward its upper position.

5. A support device as in claim 4 wherein said lower edge of said opening is provided with a notch and wherein the underside of said arm is provided with a corresponding ridge which is guided by the notch.

6. A support device as in claim 1 wherein said adjusting means includes a tightening screw mounted in a threaded hole in said leg plate.

7. A support device as in claim 1 wherein said arm is bent intermediate its ends and wherein said adjusting means engages said arm at the bend when said arm is in its unlocking position.

8. A support device as in claim 6 wherein said screw has an unthreaded part which can move freely in the threaded hole in said leg plate and is so positioned between an outer and an inner threaded part of the screw that the screw lies freely in the threaded hole when said arm lies in its unlocking position and that pushing of the screw into engagement with its inner threaded portion will swing said arm to an intermediate position which is located before that position when the hook begins to move upwardly.

* * * * *